United States Patent
Schaenzel

(10) Patent No.: US 7,147,081 B2
(45) Date of Patent: Dec. 12, 2006

(54) RACK-AND-PINION STEERING SYSTEM FOR MOTOR VEHICLES

(75) Inventor: Rainer Schaenzel, Essingen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 74 days.

(21) Appl. No.: 10/505,561

(22) PCT Filed: Feb. 18, 2003

(86) PCT No.: PCT/EP03/01600

§ 371 (c)(1),
(2), (4) Date: Aug. 23, 2004

(87) PCT Pub. No.: WO03/070541

PCT Pub. Date: Aug. 28, 2003

(65) Prior Publication Data

US 2005/0155810 A1    Jul. 21, 2005

(30) Foreign Application Priority Data

Feb. 22, 2002   (DE) ............................... 102 07 466

(51) Int. Cl.
B62D 5/04   (2006.01)
(52) U.S. Cl. .................... 180/444; 180/443; 74/388 PS
(58) Field of Classification Search ............... 180/400, 180/428, 443, 444, 446; 74/388 PS
See application file for complete search history.

(56) References Cited

U.S. PATENT DOCUMENTS 3,927,576 A    12/1975  Colleti
4,129,345 A *  12/1978  Krude ......................... 384/497
4,721,175 A *  1/1988   Butler ......................... 180/428
4,809,806 A *  3/1989   Pietrzak et al. .............. 180/428
4,987,963 A *  1/1991   Oslapas et al. .............. 180/445
5,443,083 A *  8/1995   Gotthelf ..................... 137/484.8
5,634,977 A *  6/1997   Ookouchi et al. ........... 118/423
6,435,300 B1   8/2002   Stolzenburg et al.

FOREIGN PATENT DOCUMENTS

| DE | 2 032 485   | 1/1972  |
|----|-------------|---------|
| DE | 27 34 516   | 2/1979  |
| DE | 29 00 026   | 8/1979  |
| DE | 199 17 392  | 10/2000 |
| EP | 1 277 645   | 1/2003  |
| FR | 2 769 425   | 4/1999  |
| GB | 1 001 985   | 8/1965  |
| GB | 2 012 022   | 7/1979  |
| WO | WO 98/58754 | 12/1998 |

* cited by examiner

Primary Examiner—Lesley D. Morris
Assistant Examiner—L. Lum
(74) Attorney, Agent, or Firm—Kenyon & Kenyon LLP

(57) ABSTRACT

A rack-and-pinion steering system for motor vehicles includes a rack, which is mounted in a housing such that it is longitudinally displaceable and kept in constant engagement with a pinion by a pressure piece, is connected at both ends to in each case one steering tie rod in an articulated manner, sealing bellows being fastened on one side to the housing and on the other side to the longitudinally displaceable steering rods. The steering system has a pressure compensation element integrated in the pressure piece.

11 Claims, 2 Drawing Sheets

RACK-AND-PINION STEERING SYSTEM FOR MOTOR VEHICLES

FIELD OF THE INVENTION

The present invention relates to a rack-and-pinion steering system for motor vehicles, the rack of which is mounted in a housing such that it is longitudinally displaceable, is connected at both ends to in each case one steering rod in an articulated manner, sealing bellows being fastened on one side to the housing and on the other side to the longitudinally displaceable steering rods. The bellows made from a flexible material serve to protect the articulated connection and the rack against dust, other solid bodies and humidity.

BACKGROUND INFORMATION

During driving operation, what is referred to as a pump effect occurs on account of the axial displacement movement of the rack, the pump effect widening the bellows as a result of the intake of air but also as a result of temperature-induced air expansion, and therefore subjecting them to an additional load. Secondly, a reduced pressure compared with atmosphere can occur in the bellows, which can lead to the annular folds bending inwardly. A device for compensation must be provided for the changes in volume occurring in the bellows or also within the housing.

German Published Patent Application No. 29 00 026 describes a ventilation apparatus for a shaft joint having bellows sealing, which has a slotted sleeve as a flow connection which is integrated between the shaft and the fastening sleeve of the bellows and allows air to pass. A disadvantage of such a solution is that, in the event of a wet roadway, water and dirt can penetrate through this opening into the joint space as a consequence of the proximity of the wheel and heavy occurrence of water spray, and therefore the components to be protected are subjected to increased wear.

U.S. Pat. No. 3,927,576 describes an articulated connection protected by a bellows, in which this disadvantage is eliminated by integrating solids filters in the fastening collar of the bellows or in adjoining regions of, the housing, which filters, in addition to pressure compensation between the interior and atmosphere, also prevent the penetration of moisture and dirt. However, a change to the bellows is necessary here, so that specially manufactured bellows become necessary rather than commercially available ones. The integration of the solid body filter in special ventilation openings of the housing permits subsequent installation into steering systems which are already in service only in conjunction with increased expenditure.

SUMMARY

According to an example embodiment of the present invention, a rack-and-pinion steering system is provided, in which the required pressure compensation between the interior of the bellows or of the steering mechanism housing and atmosphere may be ensured and, independently of the respective deployment situation and loading of the bellows, reliable sealing of the same may be achieved. A pressure compensation element may be integrated in the pressure piece which keeps the rack in constant engagement with the pinion.

The components to be protected may be reliably sealed using a simple arrangement and with continuous pressure compensation, and the properties of their translational movement may remain preserved without changes to the elastic bellows or to the steering mechanism housing becoming necessary.

According to an example embodiment of the present invention, a rack-and-pinion steering system for motor vehicles includes: a pinion; a rack longitudinally displaceably arranged in a steering mechanism housing, the rack including two ends, each end articulatedly connected to a respective steering tie rod; a pressure piece configured to maintain the pinion and the rack in constant engagement; a sealing bellows fastened on one side to the housing and on another side to the steering tie rods; and at least one pressure compensation element integrated in the steering mechanism housing, the pressure compensation element integrated in the pressure piece.

According to an example embodiment of the present invention, a rack-and-pinion steering system for motor vehicles includes: a pinion; a rack longitudinally displaceably arranged in a steering mechanism housing, the rack including two ends, each end articulatedly connectable to a respective steering tie rod; a pressure piece configured to maintain the pinion and the rack in constant engagement; a sealing bellows fastened on one side to the housing and fastenable on another side to the steering tie rods; and at least one pressure compensation element integrated in the steering mechanism housing, the pressure compensation element integrated in the pressure piece.

According to an example embodiment of the present invention, a rack-and-pinion steering system for motor vehicles includes: pinion means; rack means longitudinally displaceably arranged in a steering mechanism housing means, the rack means including two ends, each end articulatedly connected to a respective steering tie rod means; means for maintaining the pinion means and the rack means in constant engagement; sealing bellows means arranged on one side to the housing means and on another side to the steering rod means; and at least one pressure compensating means integrated in the steering mechanism housing means, the pressure compensating means integrated in the maintaining means.

An exemplary embodiment of the present invention is illustrated in the appended Figures and explained in the following text in greater detail.

DETAILED DESCRIPTION

Although an example embodiment of the present invention is described with reference to a rack-and-pinion steering system 1 having electrical power assistance, it may also be used in rack-and-pinion steering systems 1 having hydraulic power assistance or without power assistance or in steering systems having external power assistance, etc.

Figure 1:
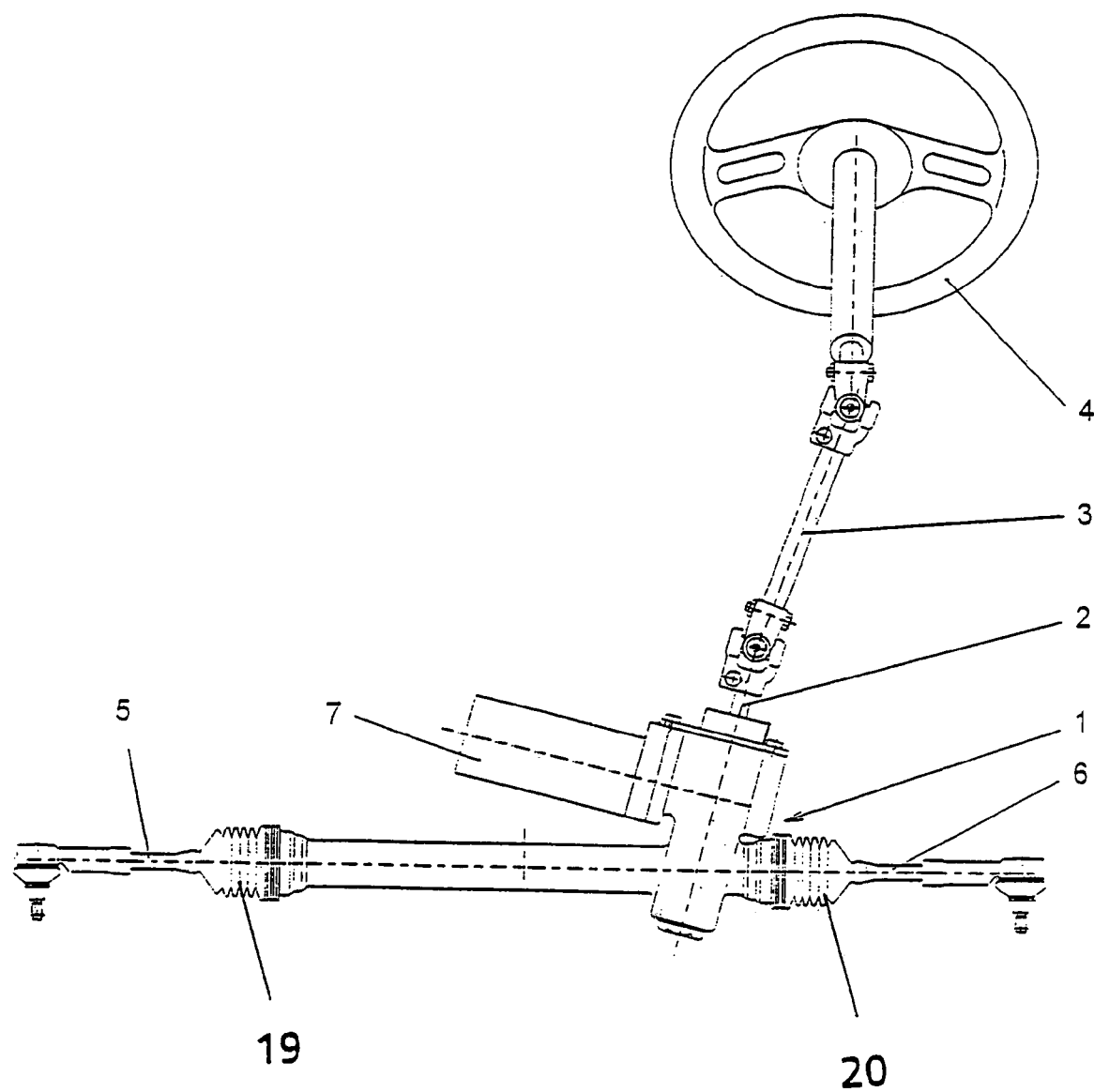
FIG. 1 is a schematic view of an electrically assisted power steering system.

In a rack-and-pinion steering system 1 of this type, a pinion 9 bears an input shaft 2 which, in the exemplary embodiment illustrated in FIG. 1, is operatively connected to a steering wheel 4 via a steering column 3 provided with universal joints. Together with two steering rods 5 and 6 whose articulated connections to the rack 12 are enclosed in a protective manner by the bellows 19 and 20, the rack of the rack-and-pinion steering system 1 forms on the output element which is operatively connected to wheels which are to be steered. Moreover, the rack 12 forms the driven part of the steering system. Using a power assisted steering system of this type, it is possible to transmit the steering torque from the steering wheel 4 to the wheels to be steered. An assisting force may be exerted on the input shaft 2 by an electric motor 7. In this exemplary embodiment, the electric motor 7 is arranged such that its axis is perpendicular with respect to the axis of the input shaft 2 and therefore of the pinion (9). However, it is also possible for its axis to be at a different angle to the axis of the input shaft 2, for example at an angle of from 60° to 130°.

With an identical or similar effect, the electric motor 7 may be arranged such that its axis is arranged parallel to the axis of the input shaft 2 and therefore of the pinion 9 or parallel to the axis of another part of the steering column 3.

In the two previously described manners of arranging the electric motor 7, the latter acts on the input shaft 2 and the pinion 9 of the rack-and-pinion steering system 1. It is possible for the electric motor 7 to be arranged such that its axis is parallel to, or at an angle to, or coaxially with respect to the axis of the rack 12 of the rack-and-pinion steering system 1.

Figure 2:
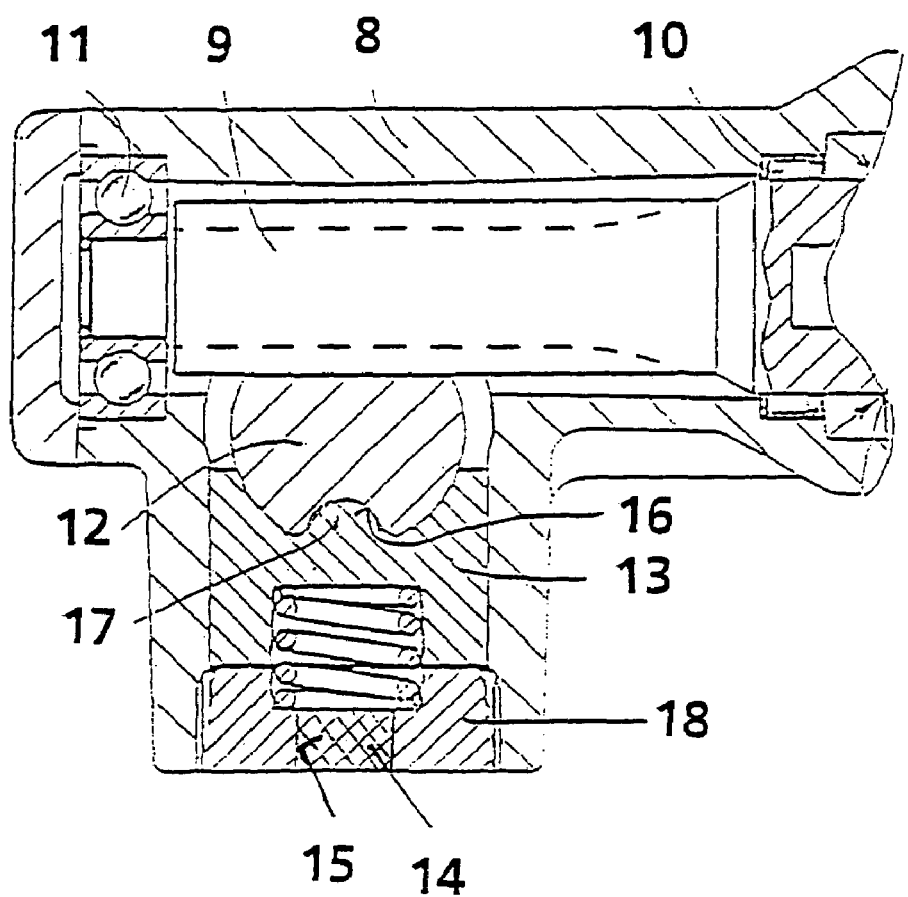
FIG. 2 is a cross-sectional view of a pressure compensation element integrated in a pressure piece.

In the cross-sectional view illustrated in FIG. 2, a pinion 9 is rotatably mounted in two bearings 10 and 11. The toothing of the pinion 9 engages with a rack 12 which is guided in the steering housing 8 in an axially displaceable manner. The rack 12 may be pressed against the toothing of the pinion 9 in a conventional manner using a spring-loaded pressure piece 13.

The rack 12 has a longitudinal groove 16 in its toothing region on the outer circumferential surface on the opposite side from the toothing. The longitudinal groove 16 interacts with a longitudinal lug 17 which is integrally formed on the pressure piece 13. The rack 12 is prevented from tilting during operation by the interaction of the longitudinal groove 16 and the longitudinal lug 17. It is possible for these two elements to be interchanged with an identical effect, so that the longitudinal lug is arranged on the rack 12 and the longitudinal groove is arranged on the pressure piece 13

A pressure compensation element 14 designed to be air and liquid permeable is integrated in the adjusting screw 18 of the pressure piece 13 for pressure compensation in the interior of the mechanism housing 8 of the rack-and-pinion steering system 1. The adjusting screw 18, arranged as a screw cap, serves to adjust the play of the pressure piece, which play may be adjusted by the amount by which the screw cap is screwed in.

For example, the pressure compensation element 14 is configured as a porous sintered plastic insert which is arranged in a cutout 15 of the adjusting screw 18, the cutout 15 being adapted to the dimensions of the sintered plastic insert.

The sintered plastic insert is configured as a pressed pellet composed of PTEE material. Here, the pressed pellet is formed from ground granules which are present, for example, in the form of small balls, the granules being joined to one another under pressure and temperature. The varied density of the sintered material, which may be critical for the air permeability value, may be influenced in a simple manner by the size and/or shape of the granules.

Here, the air permeability of the pressed pellet decreases in a manner corresponding to the magnitude of the applied pressing pressure. The property of the pressed pellet of allowing air to permeate and preventing the penetration of moisture may therefore be determined in a simple manner by the granules or the pressure and the temperature of the sintering process.

The pressure compensation element 14 may also be composed of another sintered material, such as sintered bronze or another moisture tight and air permeable solids filter which may be configured as a thin disk or diaphragm.

The entire adjusting screw 18 may be composed of porous sintered material.

The introduction of a pressed pellet into the adjusting screw 18 if the pressure piece 13 may make it simple to retrofit a pressure compensation element 14 to a steering mechanism 18 already in service, by exchanging the existing adjusting screw for one having a pressure compensation element 14.

List of Reference Numerals Used

Rack-and-pinion Steering System
Input shaft
3 Steering column
4 Steering wheel
5 Steering rod
6 Steering rod
7 Electric motor
Steering housing
Pinion
Bearing
Bearing
Rack
Pressure piece
Pressure compensation element
Cutout
16 Longitudinal groove
17 Longitudinal lug
Adjusting screw
Bellows
20 Bellows

The invention claimed is:

1. A rack-and-pinion steering system for motor vehicles, comprising:
   a pinion;
   a rack longitudinally displaceably arranged in a steering mechanism housing, the rack including two ends, each end articulatedly connected to a respective steering tie rod;
   a pressure piece configured to maintain the pinion and the rack in constant engagement;
   a sealing bellows fastened on one side to the housing and on another side to the steering tie rods; and
   at least one pressure compensation element integrated in the steering mechanism housing, the pressure compensation element integrated in the pressure piece;
   wherein the pressure compensation element is configured as a porous sintered plastic insert; and
   wherein the sintered plastic insert is arranged as a pressed pellet is pressable into a cutout.

2. The rack-and-pinion steering system according to claim 1, wherein an adjusting screw of the pressure piece includes the pressure compensation element.

3. The rack-and-pinion steering system according to claim 1, wherein an adjusting screw of the pressure piece is formed of a porous sintered material.

4. The rack-and-pinion steering system according to claim 1, wherein one of (a) the housing and (b) the adjusting screw of the pressure piece includes the cutout adapted to dimensions of the sintered plastic insert and arranged to accommodate the sintered plastic insert.

5. The rack-and-pinion steering system according to claim 1, wherein the pressed pellet is formed from ground granules joined to one another by sintering.

6. The rack-and-pinion steering system according to claim 5, wherein at least one of (a) air permeability values and (b) liquid retention capacity is influenceable by at least one of (a) a size and (b) a shape of the granules.

7. A rack-and-pinion steering system for motor vehicles, comprising:
   a pinion;
   a rack longitudinally displaceably arranged in a steering mechanism housing, the rack including two ends, each end articulatedly connected to a respective steering tie rod;
   a pressure piece configured to maintain the pinion and the rack in constant engagement;
   a sealing bellows fastened on one side to the housing and on another side to the steering tie rods; and
   at least one pressure compensation element integrated in the steering mechanism housing, the pressure compensation element integrated in the pressure piece;
   wherein the pressure compensation element is arranged as one of (a) a disk and (b) a diaphragm.

8. A rack-and-pinion steering system for motor vehicles, comprising:
   a pinion;
   a rack longitudinally displaceably arranged in a steering mechanism housing, the rack including two ends, each end articulatedly connectable to a respective steering tie rod;
   a pressure piece configured to maintain the pinion and the rack in constant engagement;
   a sealing bellows fastened on one side to the housing and fastenable on another side to the steering tie rods; and
   at least one pressure compensation element integrated in the steering mechanism housing, the pressure compensation element integrated in the pressure piece;
   wherein the pressure compensation element is configured as a porous sintered plastic insert; and
   wherein the sintered plastic insert is arranged as a pressed pellet is pressable into a cutout.

9. A rack-and-pinion steering system for motor vehicles, comprising:
   pinion means;
   rack means longitudinally displaceably arranged in a steering mechanism housing means, the rack means including two ends, each end articulatedly connected to a respective steering tie rod means;
   means for maintaining the pinion means and the rack means in constant engagement;
   sealing bellows means arranged on one side to the housing means and on another side to the steering rod means; and
   at least one pressure compensating means integrated in the steering mechanism housing means, the pressure compensating means integrated in the maintaining means;
   wherein the pressure compensation means is configured as a porous sintered plastic insert; and
   wherein the sintered plastic insert is arranged as a pressed pellet is pressable into a cutout.

10. A rack-and-pinion steering system for motor vehicles, comprising:
    a pinion;
    a rack longitudinally displaceably arranged in a steering mechanism housing, the rack including two ends, each end articulatedly connectable to a respective steering tie rod;
    a pressure piece configured to maintain the pinion and the rack in constant engagement;
    a sealing bellows fastened on one side to the housing and fastenable on another side to the steering tie rods; and
    at least one pressure compensation element integrated in the steering mechanism housing, the pressure compensation element integrated in the pressure piece;
    wherein the pressure compensation element is arranged as one of (a) a disk and (b) a diaphragm.

11. A rack-and-pinion steering system for motor vehicles, comprising:
    pinion means;
    rack means longitudinally displaceably arranged in a steering mechanism housing means, the rack means including two ends, each end articulatedly connected to a respective steering tie rod means;
    means for maintaining the pinion means and the rack means in constant engagement;
    sealing bellows means arranged on one side to the housing means and on another side to the steering rod means; and
    at least one pressure compensating means integrated in the steering mechanism housing means, the pressure compensating means integrated in the maintaining means;
    wherein the pressure compensation means is arranged as one of (a) a disk and (b) a diaphragm.

* * * * *